(12) United States Patent
Ogata

(10) Patent No.: US 9,538,037 B2
(45) Date of Patent: Jan. 3, 2017

(54) IMAGE PROCESSING APPARATUS

(71) Applicant: Oki Data Corporation, Tokyo (JP)

(72) Inventor: Keiichi Ogata, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/467,094

(22) Filed: Aug. 25, 2014

(65) Prior Publication Data
US 2015/0055147 A1    Feb. 26, 2015

(30) Foreign Application Priority Data
Aug. 26, 2013    (JP) .................................. 2013-174851

(51) Int. Cl.
| G06F 15/00 | (2006.01) |
| H04N 1/203 | (2006.01) |
| H04N 1/00  | (2006.01) |

(52) U.S. Cl.
CPC ........ H04N 1/2032 (2013.01); H04N 1/00824 (2013.01)

(58) Field of Classification Search
None
See application file for complete search history.

(56) References Cited

U.S. PATENT DOCUMENTS

| 2003/0227652 A1* | 12/2003 | Masaki ..................... 358/1.18 |
| 2007/0299989 A1* | 12/2007 | Maruyama ............ G06F 3/1204 710/5 |
| 2008/0025566 A1* | 1/2008  | Widdowson et al. ........ 382/103 |
| 2008/0170262 A1* | 7/2008  | Takahashi ................... 358/1.15 |
| 2008/0285082 A1* | 11/2008 | Morooka ..................... 358/1.18 |
| 2009/0227436 A1* | 9/2009  | Takahashi ................... 493/420 |
| 2010/0080641 A1  | 4/2010  | Iwamoto |
| 2011/0228329 A1* | 9/2011  | Suzuki ........................ 358/1.15 |
| 2012/0002232 A1* | 1/2012  | Inui ............................. 358/1.13 |
| 2012/0194828 A1* | 8/2012  | Nakamura ............ G03G 15/36 358/1.2 |

FOREIGN PATENT DOCUMENTS

JP    2010-082945 A    4/2010

* cited by examiner

*Primary Examiner* — Helen Q Zong
(74) *Attorney, Agent, or Firm* — Mots Law, PLLC

(57) ABSTRACT

An image processing apparatus includes: an image data arrangement unit configured to perform the arrangement of print image data of each page on both sides of a sheet, according to multiple-fold printing which assumes a multiple-fold equal to or more than three folds; a preview display unit configured to display on a screen the image data with at least one of fold positions in the multiple-fold being folded and with at least one of the other fold positions being spread, on the basis of the arrangement by the image data arrangement unit; and a print command output unit configured to output a print command based on an arrangement mode displayed on the preview display unit.

25 Claims, 22 Drawing Sheets

BINDING MARGIN AREA

IMAGE PROCESSING APPARATUS

CROSS REFERENCE TO RELATED APPLICATIONS

This application claims priority based on 35 USC 119 from prior Japanese Patent Application No. 2013-174851 filed on Aug. 26, 2013, entitled "IMAGE PROCESSING APPARATUS", the entire contents of which are incorporated herein by reference.

BACKGROUND OF THE INVENTION

1. Field of the Invention

The disclosure relates to an image processing apparatus and is applicable to a three-fold printing function which performs appropriate page arrangement with a physical sheet of paper to be printed folded in three sections, in a printer driver configured to control a printer connected to a computer, for example.

2. Description of Related Art

Printing by a printer connected to a computer is controlled by a printer driver of the computer. The printer driver has a variety of functions. In a normal state, a logical page for associating data managed by an application running on a computer with a physical sheet of paper and representing the data and the physical sheet of paper to be actually printed are in a one-to-one relation. In contrast to this, there are a printer and a printer driver having functions that enable a user to obtain various print results without being conscious of complicated page numbers or sheet size. The functions include layout printing which arranges logical pages on one physical sheet of paper, or bookbinding printing (booklet printing) which generates a print result having a book-like organization by using double-side printing, and the like.

In the bookbinding printing, in particular, there is printing implemented in Patent Literature 1 (Japanese Patent Application Publication No. 2010-82945). Combined with the double-side printing, this bookbinding printing is set to produce an optimal print result when printed sheets are stacked, folded in two, and bound. Specifically, a printer driver carries out all data processing necessary for bookbinding, such as optimally calculating a relationship of physical sheets of paper and logical pages to reorganize page order by the printer driver, or reducing for layout, the size of the logical pages to be printed on sheets, and the like. This enables an application or a user to achieve bookbinding simply by performing various settings with the printer driver and without modifying page numbers of data of the application. This is a convenient function for users and the like.

SUMMARY OF THE INVENTION

In most cases, general bookbinding printing targets physical sheets of paper folded in two. However, there is bookbinding printing having a three-fold printing function which makes a booklet consisting of physical sheets folded in three. To perform the three-fold printing, it is necessary to appropriately arrange three logical pages necessary therefor. Then, since each logical page is arranged independently, the logical pages need to be associated with each other to create a booklet in which two spread faces of three folds are configured by double running pages. Specifically, an operator needs to create application data by figuring out the page order which varies depending on three folds and mutually associating logical pages.

Thus, in order to make the two spread faces by the double running pages in the process of unfolding of the three folds, the operator needs to consider in advance in what arrangement each logical page must be printed. There is a problem, however, that this work is troublesome.

Moreover, there is a similar problem that the work is troublesome also when sheets are folded in four or more.

A first aspect of the invention is an image processing apparatus that includes: an image data arrangement unit configured to arrange pages of specified print image data on both sides of a print sheet according to three-fold printing which assumes or produces three folds, with the image data arrangement unit creating arrangement modes; a preview display unit configured to display on a screen each of the arrangement modes with at least one part of the three folds folded; a print mode specification unit configured to allow one arrangement mode to be specified, as a print mode, from the arrangement modes displayed on the preview display unit; and a printer command converter configured to generate a print command to print in the print mode specified through the print mode specification unit.

According to the first aspect of the invention, users can implement three-fold printing without doing any troublesome data modification work.

A second aspect of the invention is an image processing apparatus that includes: an image data arrangement unit configured to perform an arrangement of the print image data of each page on both sides of a sheet, according to the printing which assumes a multiple-fold equal to or more than three folds; a preview display unit configured to display on a screen the image data with at least one of the fold positions in the multiple-fold being folded and with at least one of the other fold positions being spread, on the basis of the arrangement by the image data arrangement unit; and a print command output unit configured to output a print command based on an arrangement mode displayed on the preview display unit.

A third aspect of the invention is an image forming system that includes: an image data arrangement unit configured to perform an arrangement of the print image data of each page on both sides of a sheet, according to multiple-fold printing which assumes multiple-fold equal to or more than three folds; a preview display unit configured to display on a screen the image data with at least one of the fold positions in the multiple-fold being folded and with at least one of the other fold positions being spread, on the basis of the arrangement by the image data arrangement unit; and a print command output unit configured to output a print command based on an arrangement mode displayed on the preview display unit.

According to the second and third aspects of the invention, users can implement three-or-more-folding printing without doing any troublesome data modification work.

DETAILED DESCRIPTION OF EMBODIMENTS

Figure 1:
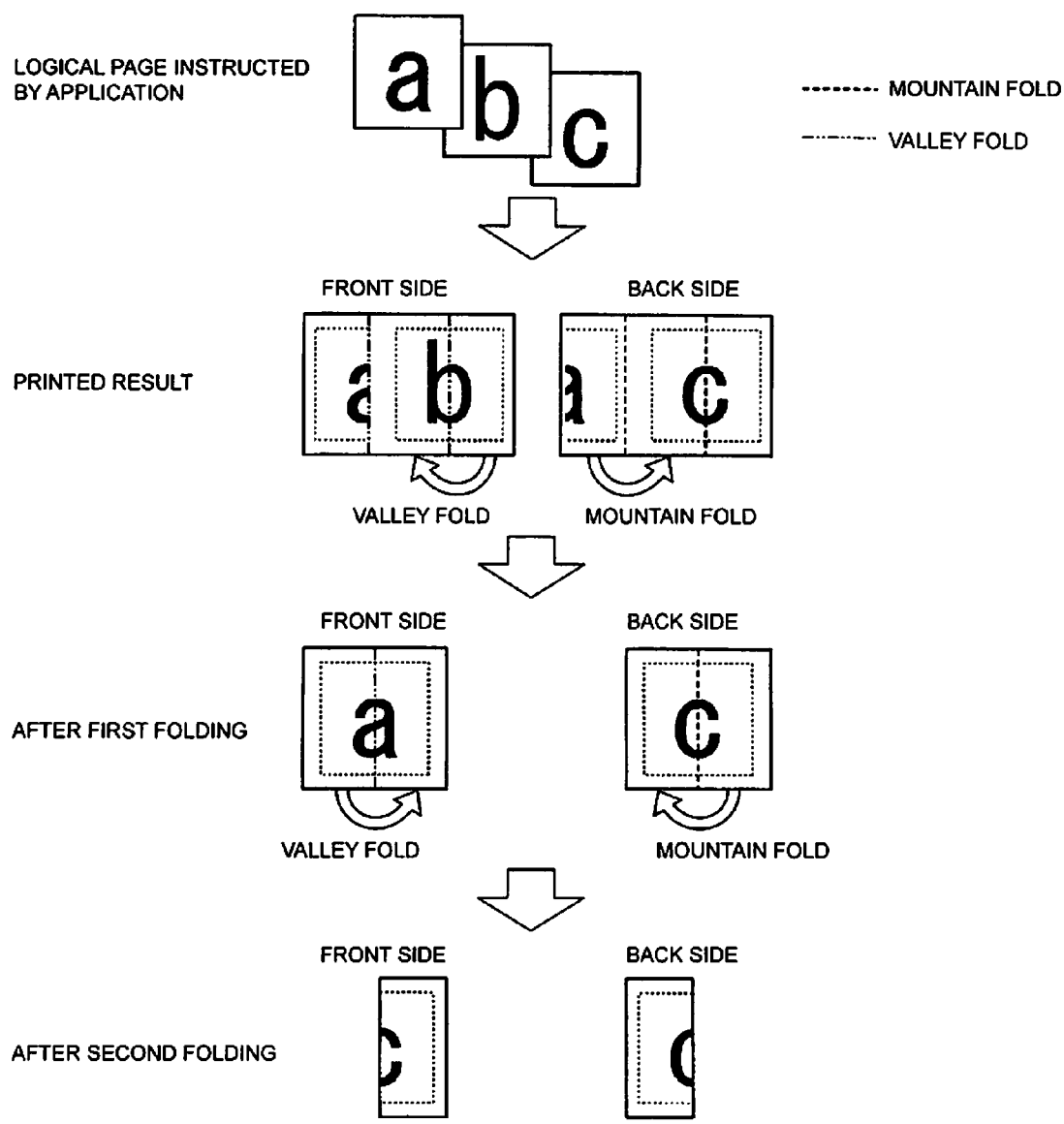
FIG. 1 is a schematic view illustrating an example of C-fold, right-front printing of three-fold printing.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

First Embodiment

First of all, a first embodiment of the invention is described.
(A-1) Configuration The invention is to provide an image processing apparatus which achieves booklet printing with a printer driver, the booklet printing configuring two spread faces of three folds by double running pages.

In three-fold printing, each logical page generated by an application is combined with double-side printing, as illustrated in FIG. 1. Particularly, a printer driver configures, as print data for a front side, a result of the synthesis of a left half of a first page and a second page by misaligning positions thereof and, as print data for a back side, a result of synthesis of a right half of the first page and a third page by misaligning positions thereof. Using print data obtained from this and printing according to fold lines to be added to, and printed at, boundaries of respective logical pages enable acquisition of three-fold printing in which two spread faces of three folds constitute a continuous representation.

Figure 2:
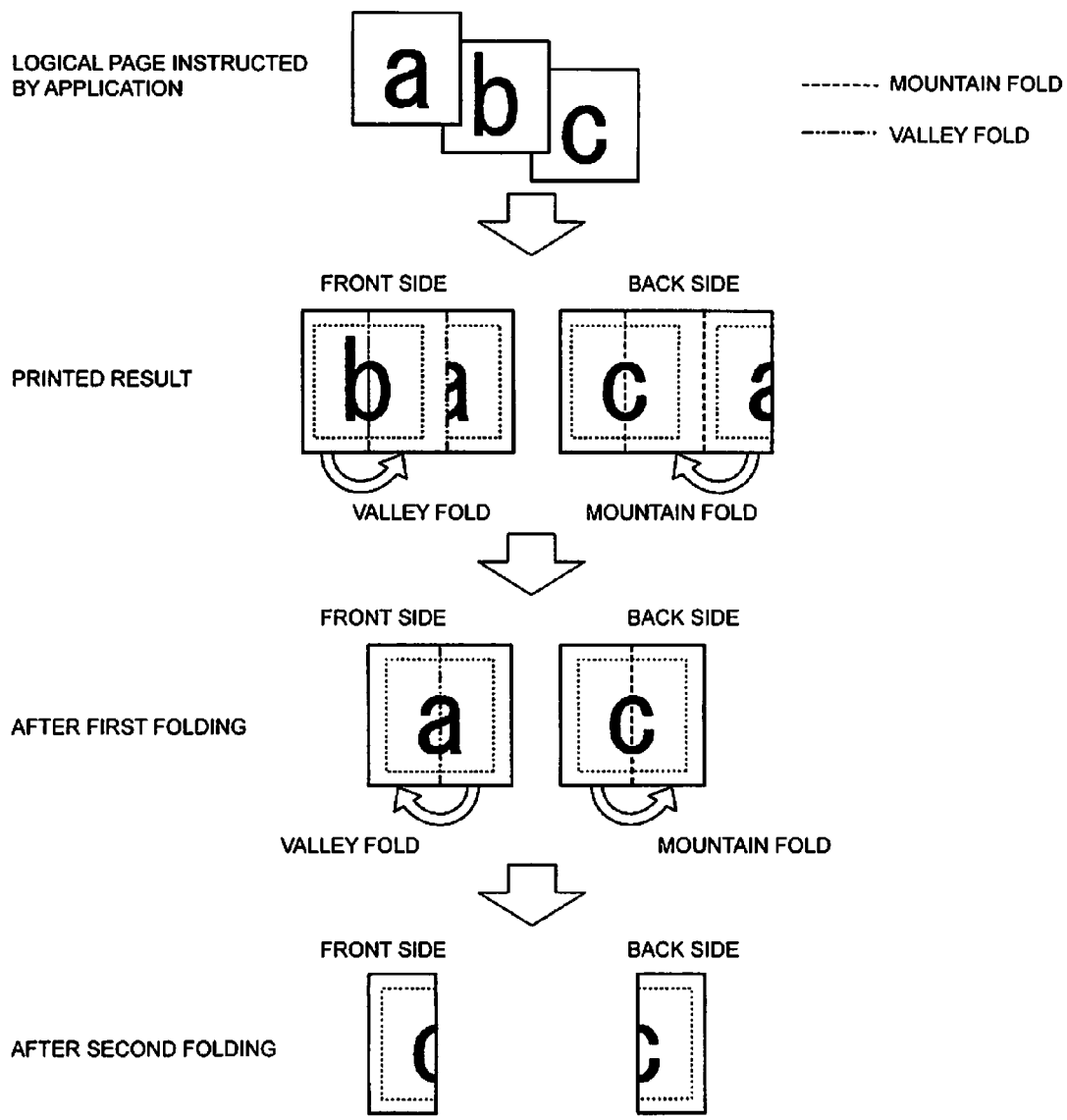
FIG. 2 is a schematic view illustrating an example of C-fold, left-front printing of three-fold printing.
Figure 3:
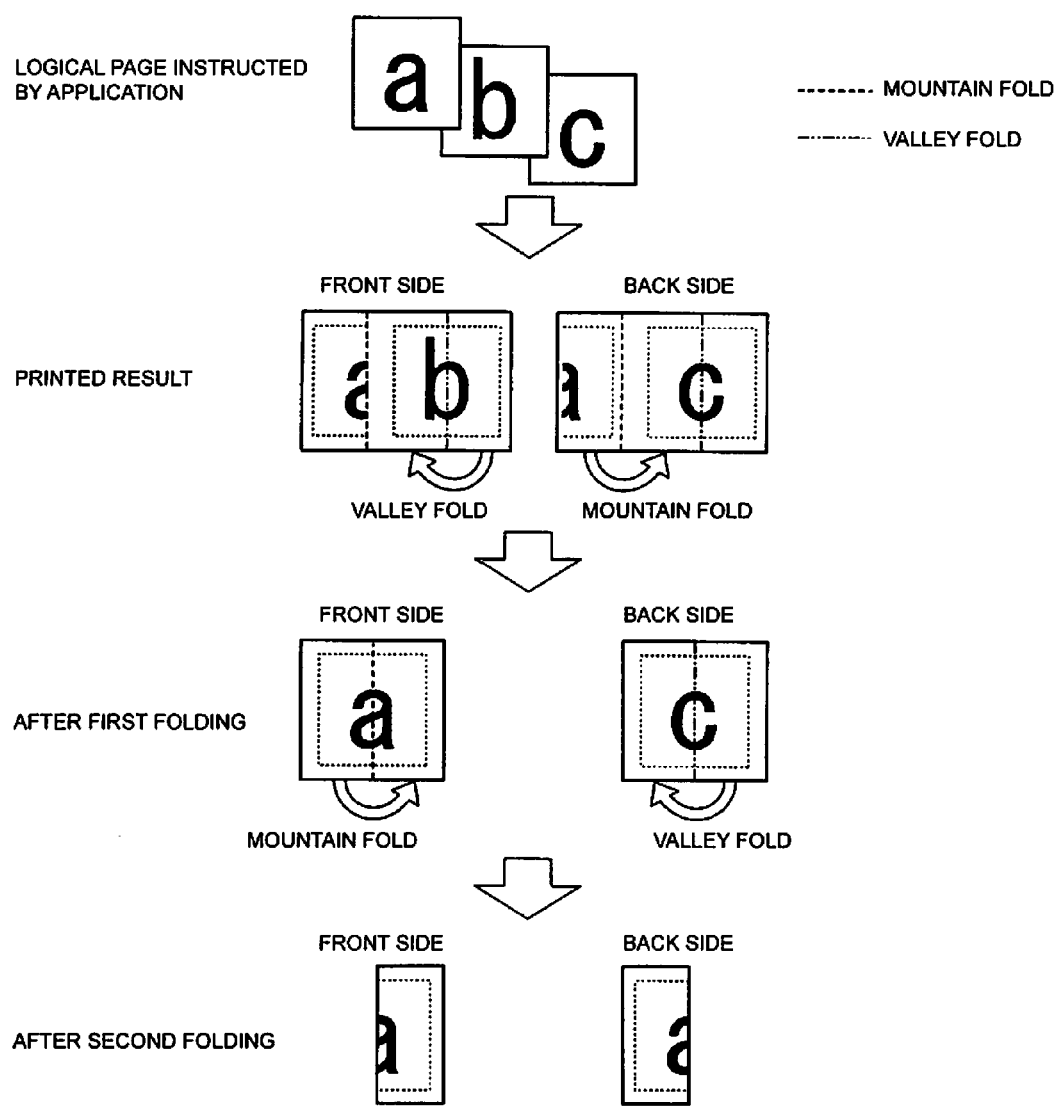
FIG. 3 is a schematic view illustrating an example of Z-fold, right-front printing of three-fold printing.
Figure 4:
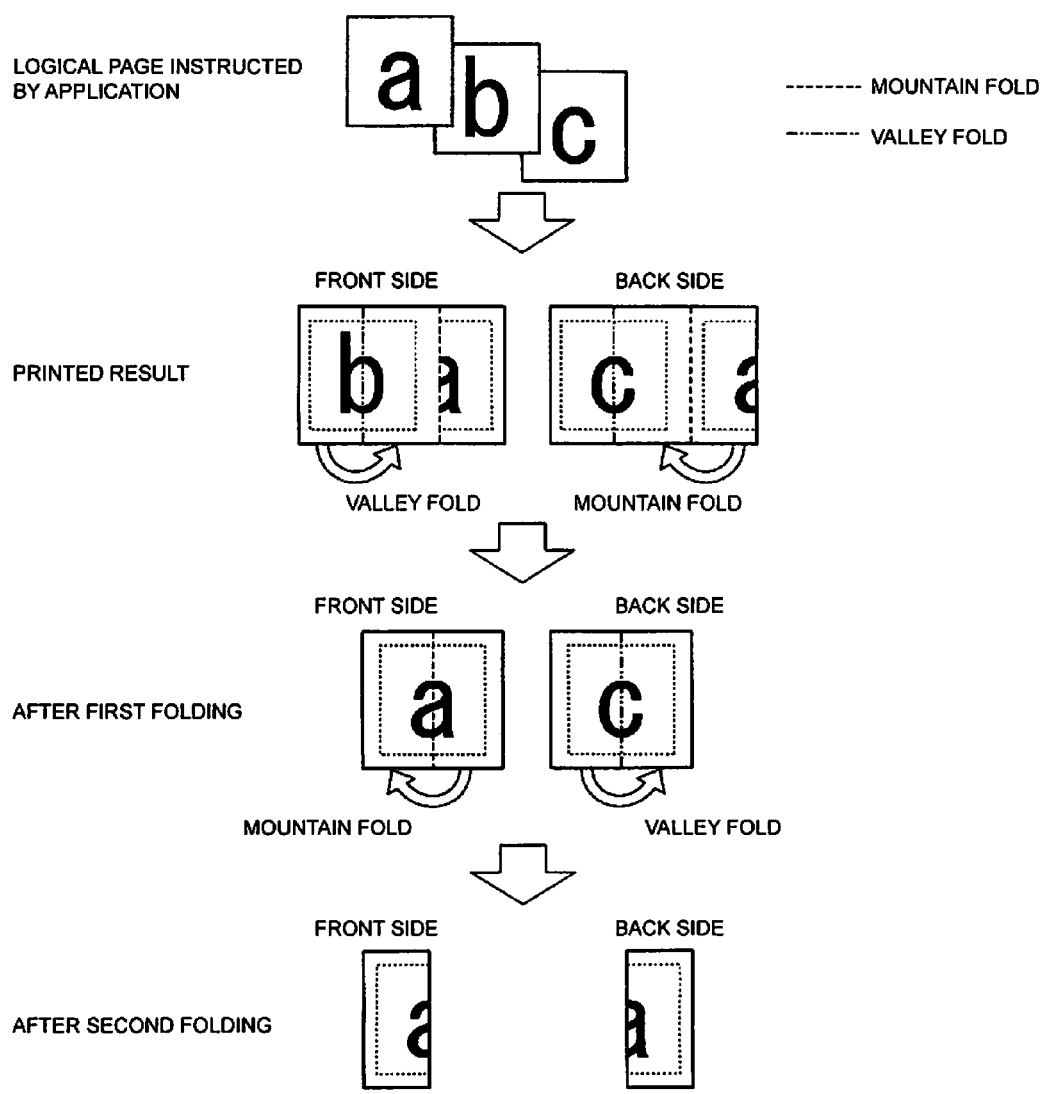
FIG. 4 is a schematic view illustrating an example of Z-fold, left-front printing of three-fold printing.

Given a line attribute distinguished between a mountain fold and a valley fold, fold lines prevent an error in the determination on which of the mountain fold or the valley fold is to be used. In addition, an arrangement of the mountain fold and the valley fold is also considered. Particularly, two types of print results can be obtained: C-folds in which a surface of a sheet of paper is folded all in valley folds, and Z-folds in which valley folds and mountain folds are combined. In addition, depending on whether the right side or the left side of a physical page (print sheet) is an outer side, two fold types of right-front or left-front can be selected. Combining these allows for the selection of four types of three-fold printing. FIG. 1 is an example of C-fold right-front printing. FIG. 2 is an example of C-fold left-front printing. FIG. 3 is an example of Z-fold right-front printing. FIG. 4 is an example of Z-fold left-front printing. In each printing example, fold lines which serve as a guide for a user to perform a folding process are added on boundaries of logical pages and at the center. Use of a different line for mountain folds and valley folds makes it possible to clearly distinguish fold lines for the mountain folds and those for the valley folds, thereby preventing an error in a folding direction.

Figure 5:
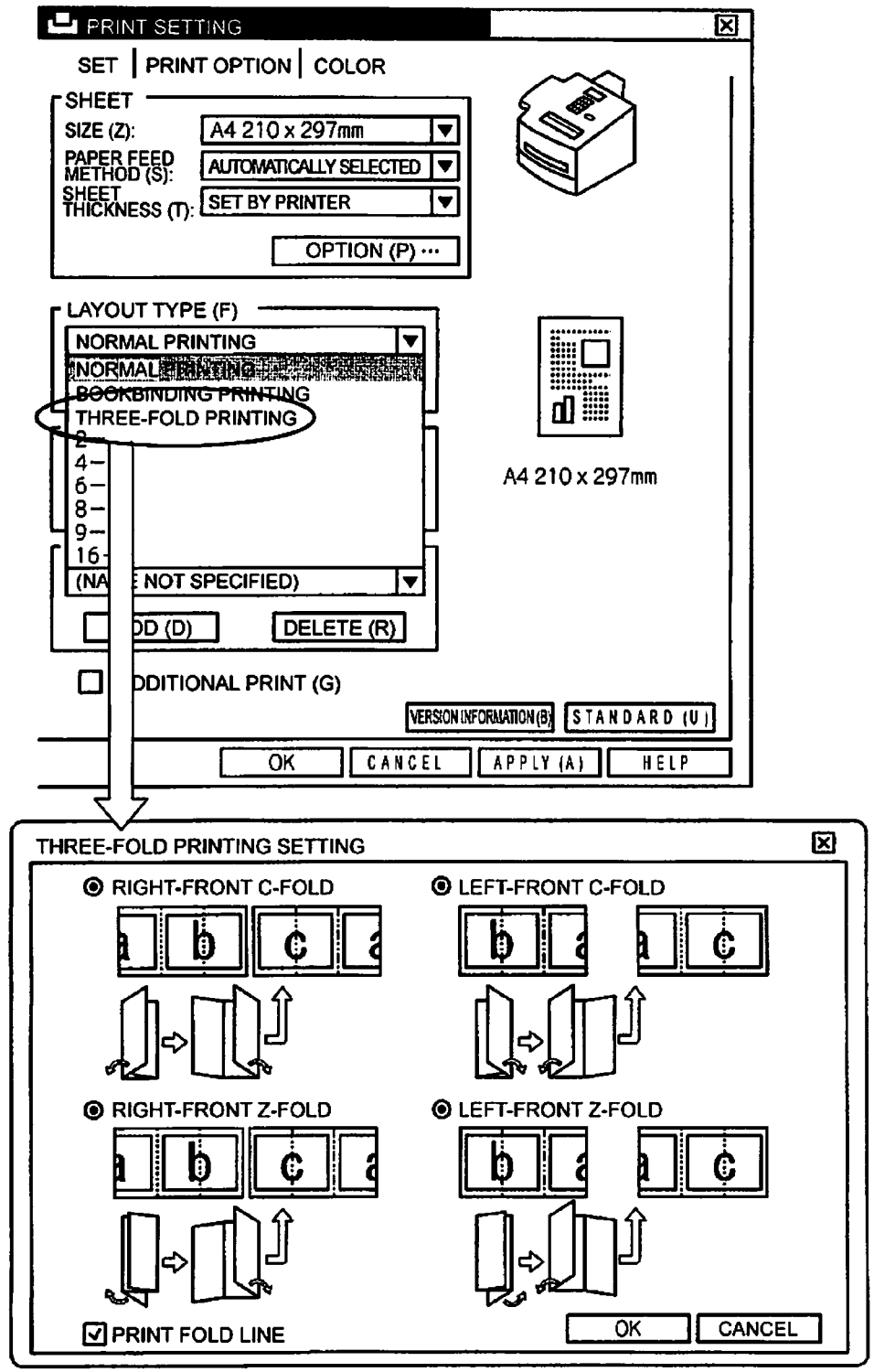
FIG. 5 is a schematic view illustrating a print result on a physical page of a three-fold scheme, and how each page is laid out in the process of unfolding.

As illustrated in FIG. 5, the printer driver displays as a preview print results of respective three-fold methods on physical pages, and a view portraying how each page is laid out in the unfolding process. The preview figures include images showing fold lines and folding steps. This portrays in an easily understandable manner which mode (three-fold arrangement mode) matches a print result desired by a user. This three-fold print setting screen in FIG. 5 is a print setting item result preview display unit configured to display on a screen a state in which at least one part of three folds is folded, in order to show how each logical page of print image data, for which three-fold printing is assumed, is arranged on a print sheet (three-fold arrangement mode). In FIG. 5, while four three-fold arrangement modes are displayed on a three-fold printing setting screen, a user can select, as a print mode, one of the four arrangement modes through the three-fold printing setting screen in FIG. 5. Specifically, the three-fold printing setting screen in FIG. 5 is also a print mode specification unit which allows the user to specify, as a print mode, one of arrangement modes (candidates) displayed in the print setting item result preview display unit.

Figure 6:
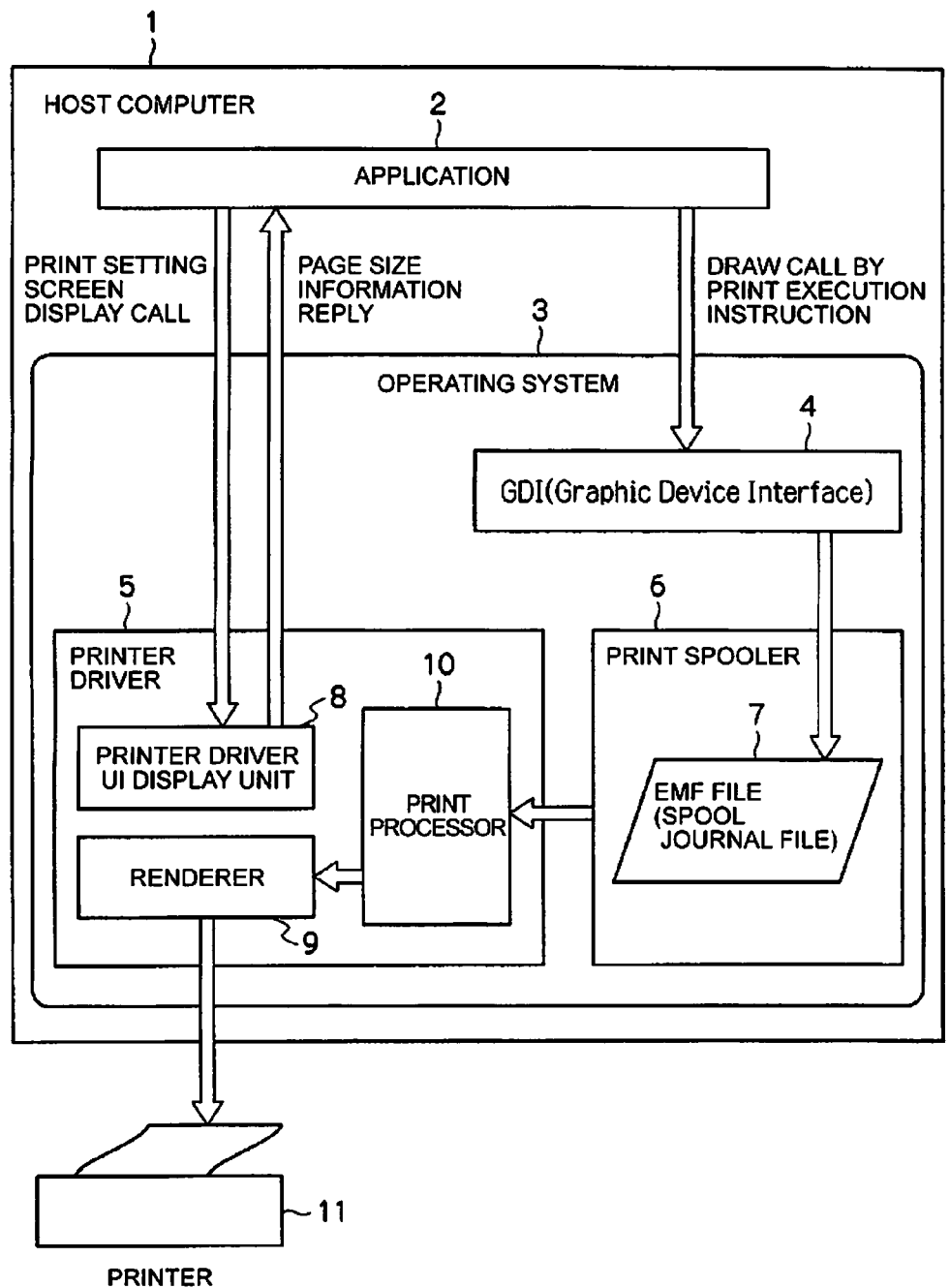
FIG. 6 is a schematic configuration diagram illustrating a host computer according to a first embodiment of the invention.

In the following, host computer 1 mounted on the image processing apparatus is described. FIG. 6 illustrates a schematic configuration of this host computer 1.

Host computer 1 mainly includes application 2 and operating system 3. Operating system 3 runs on host computer 1, and application 2 is installed. GDI (Graphic Device Interface) 4 which directly receives a print order from application 2 is implemented in operating system 3. This GDI 4 abstracts a drawing process, which varies depending on the device, to applications and absorbs any difference therebetween. In addition, printer driver 5 is installed in operating system 3. This printer driver 5 includes printer driver UI display unit 8 for users to change and instruct various print settings via application 2. Printer driver 5 further includes renderer 9 and print processor 10.

In addition, print spooler 6 is implemented as a component of operating system 3. This print spooler 6 records a draw call resulting from a print execution instruction from application 2 byway of GDI 4, as a journal file in EMF file 7. Then, print spooler 6 calls print processor 10 which is a component of printer driver 5. Print processor 10 reads and interprets the content of EMF file 7 retaining print image data per page which is specified by a host device, calls renderer 9, which is a component of printer driver 5, to convert the content into a print order, and transmits the print order to printer 11.

Figure 7:
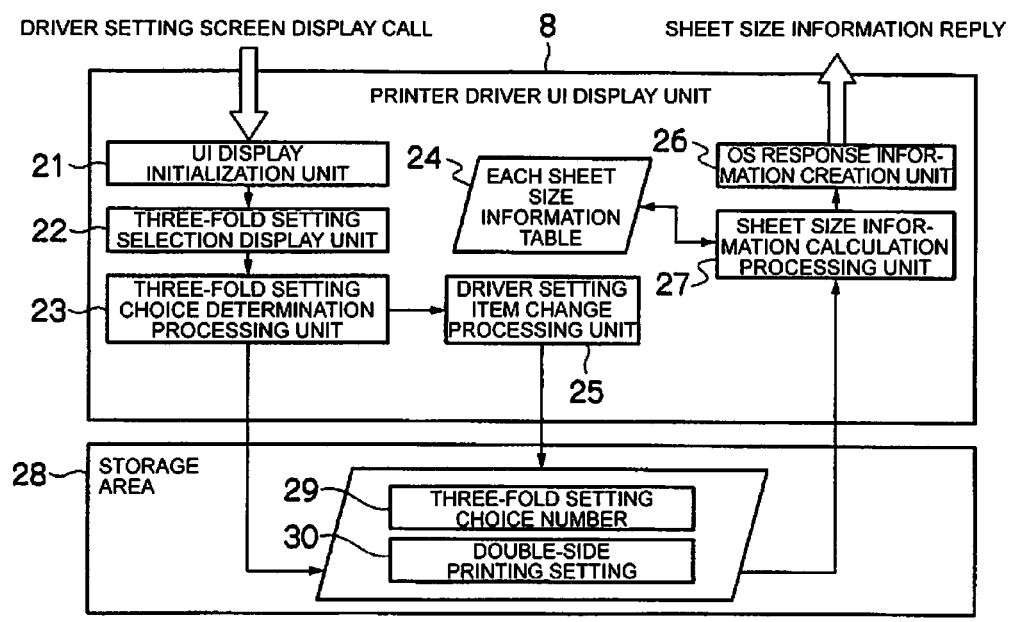
FIG. 7 is a schematic configuration diagram illustrating a printer driver UI display unit according to the first embodiment of the invention.

As illustrated in FIG. 7, printer driver UI display unit 8 transmits sheet size information in response to the driver setting screen display call from application 2. Particularly, after an initial state is determined by UI display initialization unit 21, which initializes and displays display content, based on the driver setting screen display call from application 2, three-fold setting selection display unit 22 displays the three-fold printing setting screen (see FIG. 5), prompting the user to set a set value for three folds (select an arrangement mode). Three-fold setting choice determination processing unit 23 determines what value is set, from a choice (print mode) selected by the user. Three-fold setting choice determination processing unit 23 saves in storage area 28 three-fold setting choice number 29 for retaining the set value determined by driver setting item change processing unit 25 and double-side printing setting 30 which is set simultaneously with three-fold printing. Driver setting item change processing unit 25 is a print setting item change processing unit which automatically sets and specifies a command instructing execution of a double-side printing operation which is necessary to arrange image data on front and back sides of a sheet of paper when three-fold printing is specified by the determined item.

Then, a logical page having a size suitable for achieving three-fold printing is calculated. Particularly, sheet size information calculation processing unit 27 reads the corresponding sheet size from each sheet size information table 24 which retains the standard sheet size originally retained by the driver, and makes an appropriate correction on this sheet size based on three-fold setting choice number 29 retained in storage area 28. Then, sheet size information calculation processing unit 27 replies to application 2 with information on the appropriately corrected sheet size by way of OS response information creation unit 26. Specifically, sheet size information calculation processing unit 27 acquires from storage area 28 whether or not there is three-fold printing, and converts the sheet size into a size suitable for three-fold printing, on the basis of the sheet size information which is retrieved by searching each sheet size information table 24. OS response information creation unit 26 replies to the host device with sheet size information of a calculation result at sheet size information calculation processing unit 27. Note that each sheet size information table 24 retains information such as types of sheets which a printer can handle, sheet size, a printable area and the like.

When printing starts according to a print execution instruction after printer driver UI display unit 8 performs a three-fold setting by way of application 2, printer driver renderer 9 operates.

Figure 8:
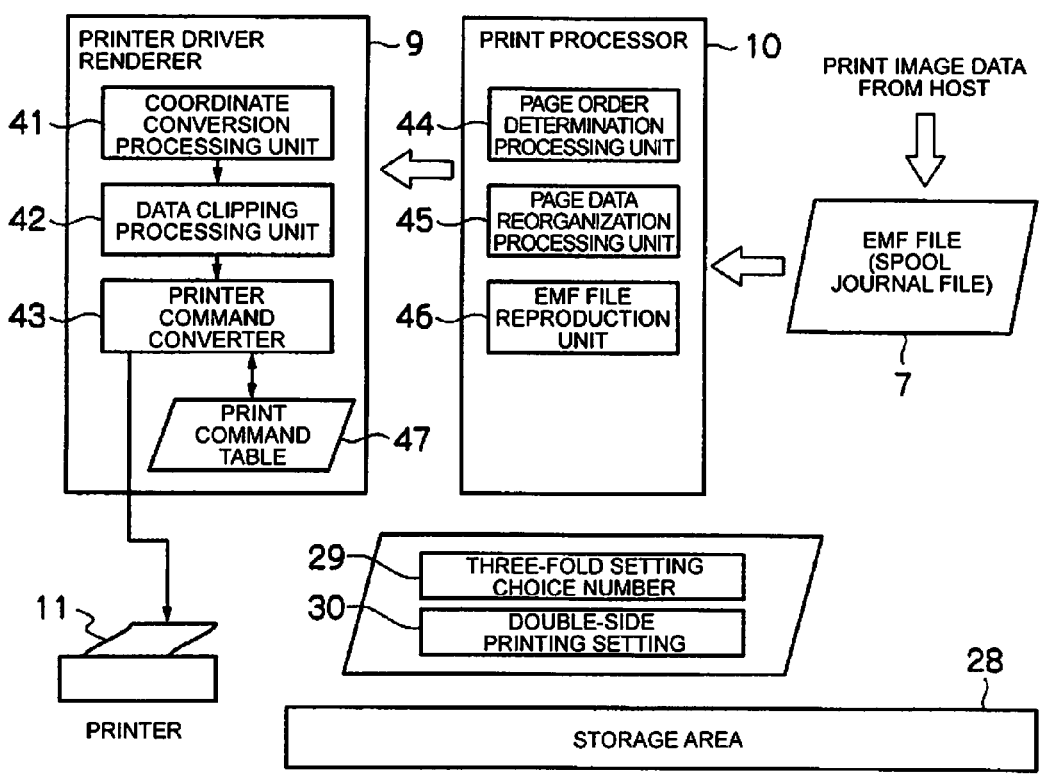
FIG. 8 is a printer driver renderer and a print processor according to the first embodiment of the invention.

Printer driver renderer 9 and print processor 10 are configured as illustrated in FIG. 8. First, print spooler 6 generates EMF file 7 retaining print image data generated by application 2. Print processor 10, which is a component of printer driver 5, reads that EMF file 7. Now, print processor 10 is an image data arrangement unit configured to determine an arrangement position and orientation of each page of the sheets on which print image data specified by the host device is printed, in accordance with three-fold printing, and includes a page order determination processing unit 44, page data reorganization processing unit 45, and EMF file reproduction unit 46. Page order determination processing unit 44 is configured to generate page numbers suitable for three-fold printing based on the content of read EMF file 7. Specifically, page order determination processing unit 44 determines the page order suitable for three-fold printing based on information on whether or not there is three-fold printing, the information being retained in storage area 28. Page data reorganization processing unit 45 is configured to acquire pages in EMF file 7 according to the determined page order. Specifically, page data reorganization processing unit 45 sorts the page numbers according to the page order of the acquired result. EMF file reproduction unit 46 is configured to process data on an acquired page basis. Furthermore, EMF file reproduction unit 46 calls printer driver renderer 9 configured to convert a draw order to a printer command. Specifically, EMF file reproduction unit 46 calls the printer driver renderer converting the draw order into a command, on the basis of the reorganized page data.

Printer driver renderer 9 includes coordinate conversion processing unit 41, data clipping processing unit 42, and printer command converter 43.

Coordinate conversion processing unit 41 is configured to convert the coordinates to correct a position in order to arrange drawing data in a configuration of three-fold printing. Specifically, coordinate conversion processing unit 41 is called by EMF file reproduction unit 46 and determines the coordinates converted in order to arrange image data at an appropriate logical page position within a physical sheet, depending on whether or not there is three-fold printing.

Data clipping processing unit 42 is configured to mask and clip data which comes out of the physical page, due to the converted coordinates. Specifically, due to the result of the conversion by coordinate conversion processing unit 41, data clipping processing unit 42 performs a conversion to delete any coming-out part, on data located in coordinates out of the physical sheet or on data coming out of the logical page and located in a range overlapping another logical page.

Printer command converter 43 is configured to convert drawing data corrected by coordinate conversion processing unit 41 and data clipping processing unit 42 into a command. Specifically, printer command converter 43 converts final print image data, on which coordinate conversion and clipping processes are performed, into a printer print command. In other words, printer command converter 43 generates a print command for the printer to similarly print the result displayed on the print setting item result preview display unit. Then, data generated from printer command converter 43 is transmitted to printer 11.

Then, processing functions of each flowchart, to be discussed below, are stored in printer driver 5.

(A-2) Operation

Figure 9:
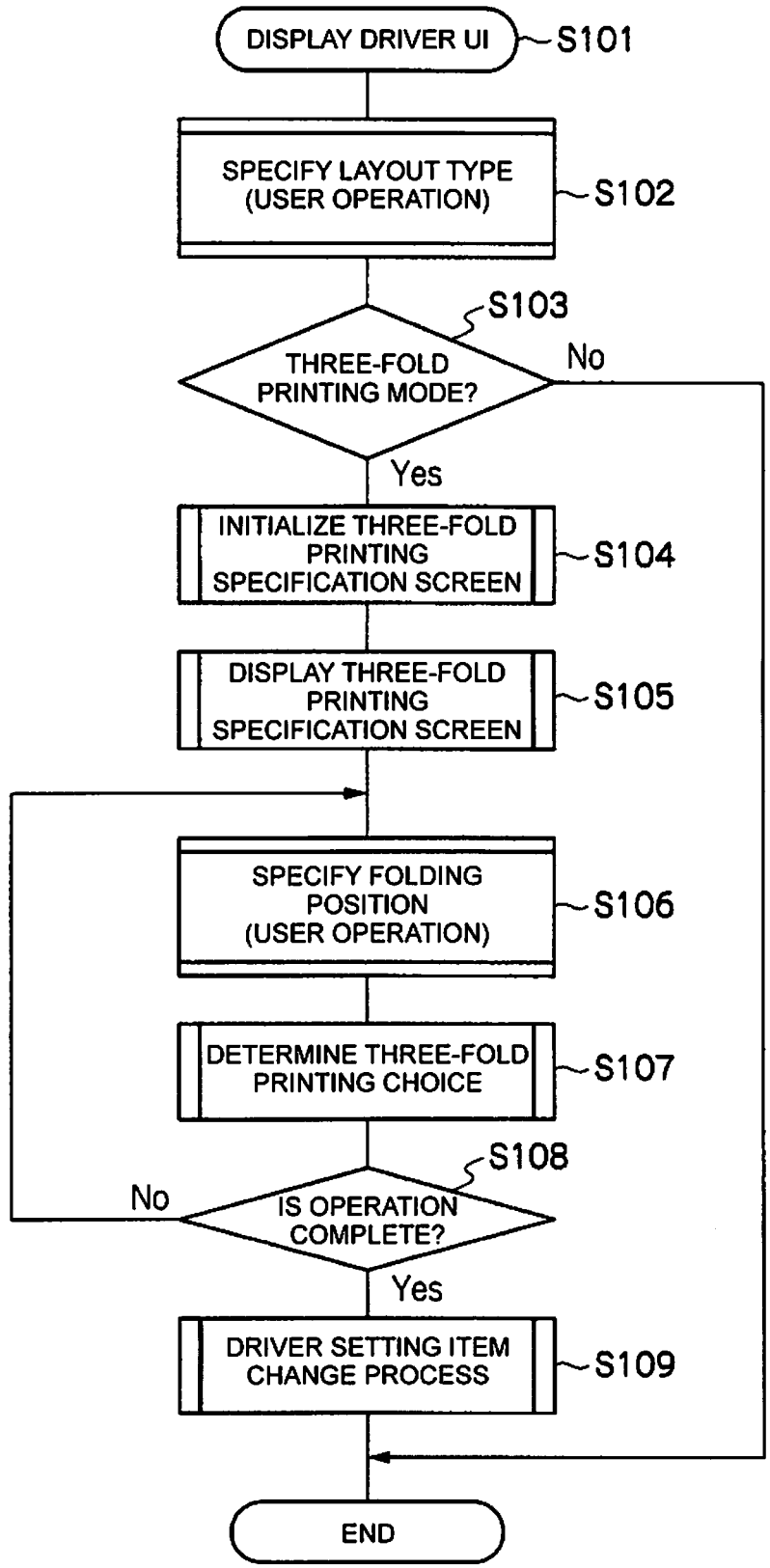
FIG. 9 is a flowchart illustrating an operation of a three-fold setting screen display process which changes a print setting of a driver to specify three-fold printing.

In the following, FIG. 9 illustrates an operation of a three-fold setting screen display process which changes print settings of a driver to specify three-fold printing when printing is performed from application 2.

With printer driver UI display unit 8 displayed (S101), after a layout type is specified through user operation (S102), it is judged whether or not the layout type is three-fold printing (S103). Now, if it is judged that the layout type is not the three-fold printing, the process ends. If it is judged that the layout type is the three-fold printing, UI display initialization unit 21 sets an initialization state on a three-fold printing specification screen (S104), and a print specification screen (see FIG. 5) of three-fold setting selection display unit 22 is displayed (S105). If a fold position (print mode) is specified from a choice through user operation (S106), three-fold set value choice determination processing unit 23 performs a choice determination process (S107). Then, it is judged whether or not the operation is complete (S108). If it is judged that the user operation is not complete, the process returns to S106 to repeat the above processing. If it is judged that the user operation is complete, driver setting item change processing unit 25 performs a driver setting item change process (S109) for changing three-fold setting choice number 29 in storage area 28 and double-side printing setting 30 which is also necessary to achieve three-fold printing, and completes the setting. What is changed and set here is subsequently referred to when the print image data generated by application 2 is processed.

Figure 10:
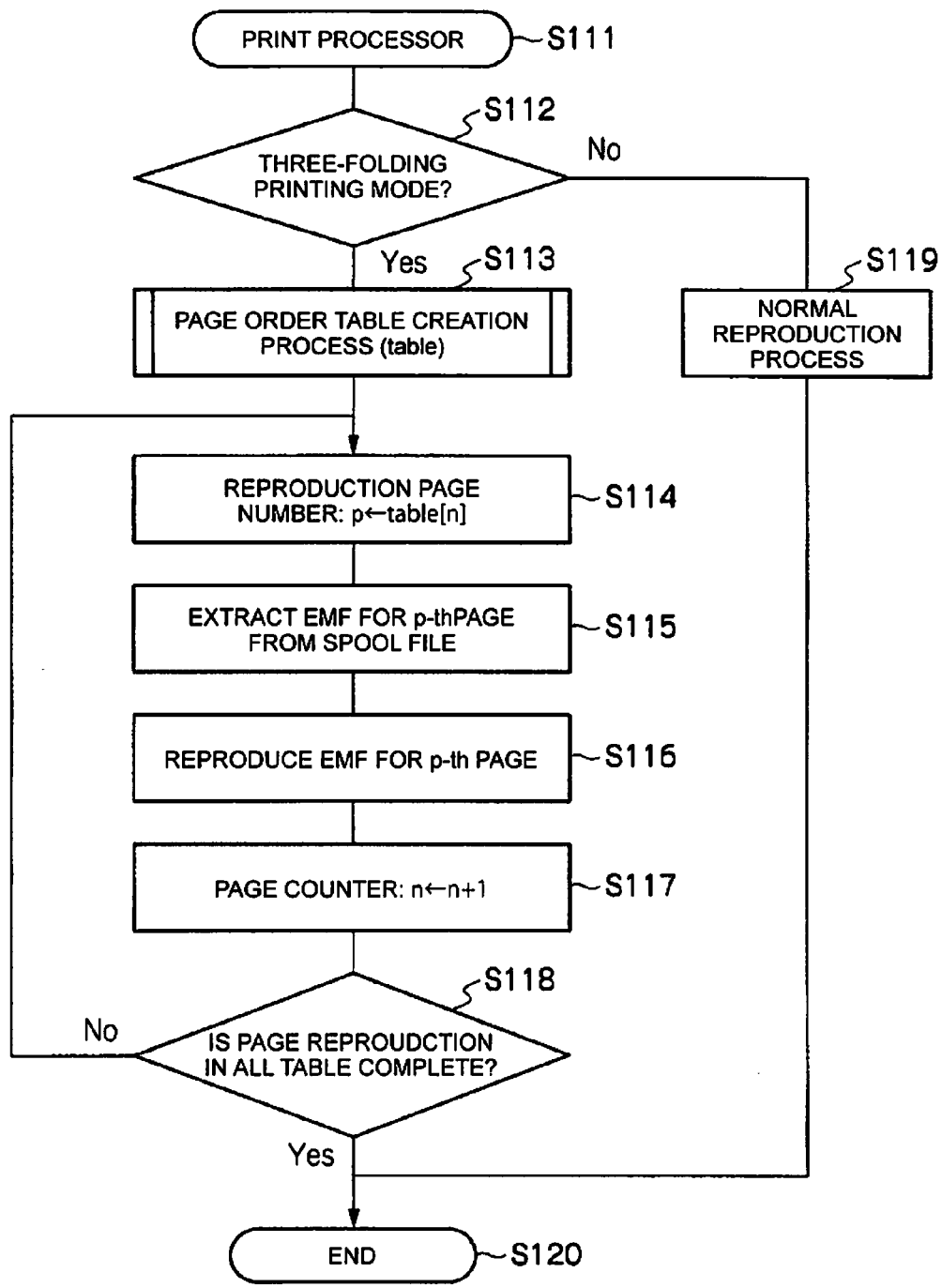
FIG. 10 is a flowchart illustrating an operation when an EMF file which retains print image data generated by an application is processed.

In the following, FIG. 10 illustrates an operation when EMF file 7 which retains print image data generated by application 2 is processed.

When print processor 10 starts processing EMF file 7 (S111), first, it is judged based on three-fold setting choice number 29 in the storage area whether or not a three-fold printing mode is set (S112). If it is judged that the three-fold printing mode is not set (No), a normal reproduction process according to a normal print sequence is performed (S119). If it is judged that the three-fold printing mode is set (Yes), a reproduction process according to the page order in three-fold printing is performed (S113). Specifically, the page order which is created by a page order table creation process to be described below is stored in a table, and reproduction is performed according to this table. Then, after a reproduction Page No. p is acquired from an N-th table (S114) and p-th page data is extracted from a spool file (S115), EMF file reproduction unit 46 processes EMF on a p-th page basis. After the reproduction of one p-th page is carried out (S116), a page counter is updated (S117), and it is judged whether or not reproduction of all pages in the table is complete (S118). Here, if it is judged that the reproduction of all pages is not complete (No), the process returns to S114 to continue to perform the reproduction of a next Page No. in the table (S114 to S117). If it is judged that the reproduction of all pages is complete (Yes), the process ends (S120).

Figure 11:
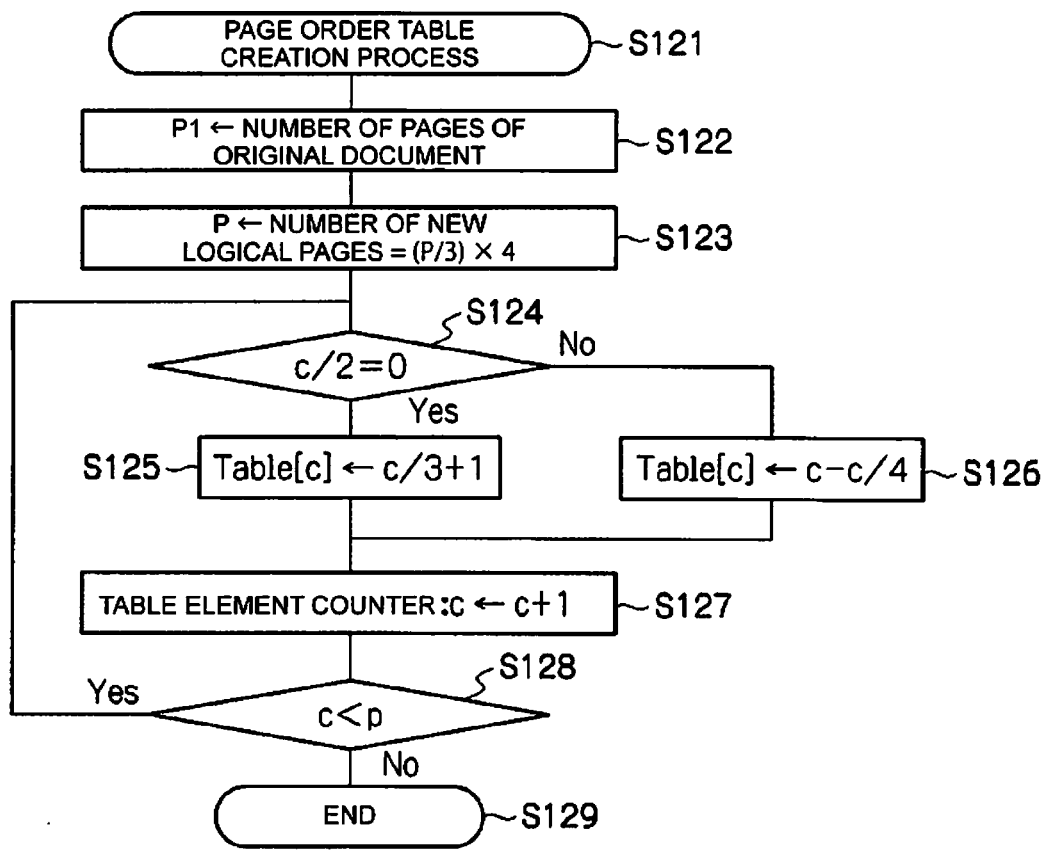
FIG. 11 is a flowchart illustrating a page order table creation process.

In the following, FIG. 11 illustrates a page order table creation process.

When print processor 10 is called and the process is started (S121), the number of pages of the original document contained in an original EMF file is acquired (S122) to calculate the number of new logical pages which are actually reproduced (S123). This number of pages is determined from (P/3)×4.

Then, the page order only for the number of new logical pages is determined with a loop. With the page counter assumed to be c, it is judged whether or not c/2=0, that is to say, whether or not the number of pages is an even number (S124). Here, if it is judged that the number of pages is an even number, a table has Page Nos. given by (c/3)+1 (S125). If it is judged that the number of pages is an odd number, the table has Page Nos. given by c−(c/4) (S126). The Page Nos. are stored in an array of the table [c].

Then, a table element counter is updated (S127), and it is judged whether or not the page counter shows a value which is less than the number of new logical pages (S128). Here, if it is judged that the value does not exceed the number of new logical pages (Yes), the process proceeds to a next page and repeats S124 to S127. If it is judged that the value is greater than the number of new logical pages (No), the process ends, considering that creation of a table for the number of all pages is complete (S129).

Figure 12:
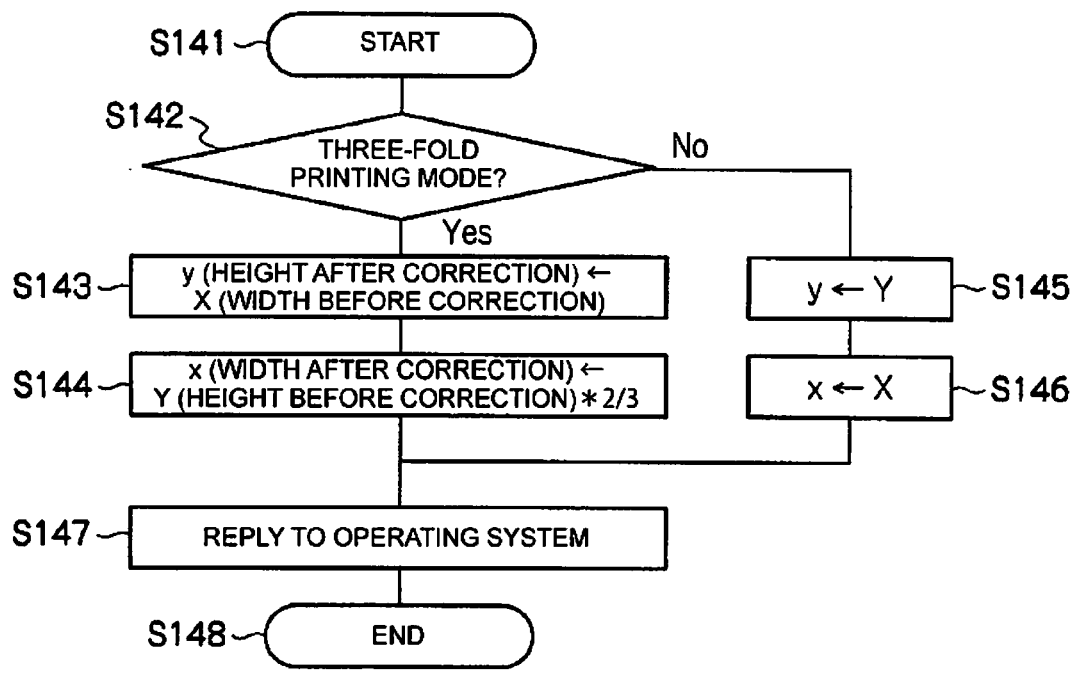
FIG. 12 is a flowchart illustrating a page size correction process of a driver when a page size is made suitable for three-fold printing.

The logical page size that is sent back in reply to application 2 and operating system 3 is the page size which becomes suitable for three-fold printing as the original physical page size is corrected. FIG. 12 illustrates then a page size correction process of a driver.

When the process is started with a call from operating system 3 (S141), three-fold setting choice number 29 is acquired from the storage area to judge whether or not there is three-fold printing (S142). Here, if it is judged that there is three-fold printing (Yes), width X before correction is directly used as height y after correction (S143), and width x after correction is converted into a value to be obtained by multiplying height Y before the correction by 2/3 (S144). Values thus obtained are sent back in reply to operating system 3 (S147), and the process ends (S148).

On the one hand, if it is judged that there is not three-fold printing (No) in S142, the height y after correction is made the same value as the original physical page size (S145), and the width x after correction is made the same value as the original physical page size (S146). Then, the values are sent back in reply to operating system 3 (S147), and the process ends (S148).

Figure 13:
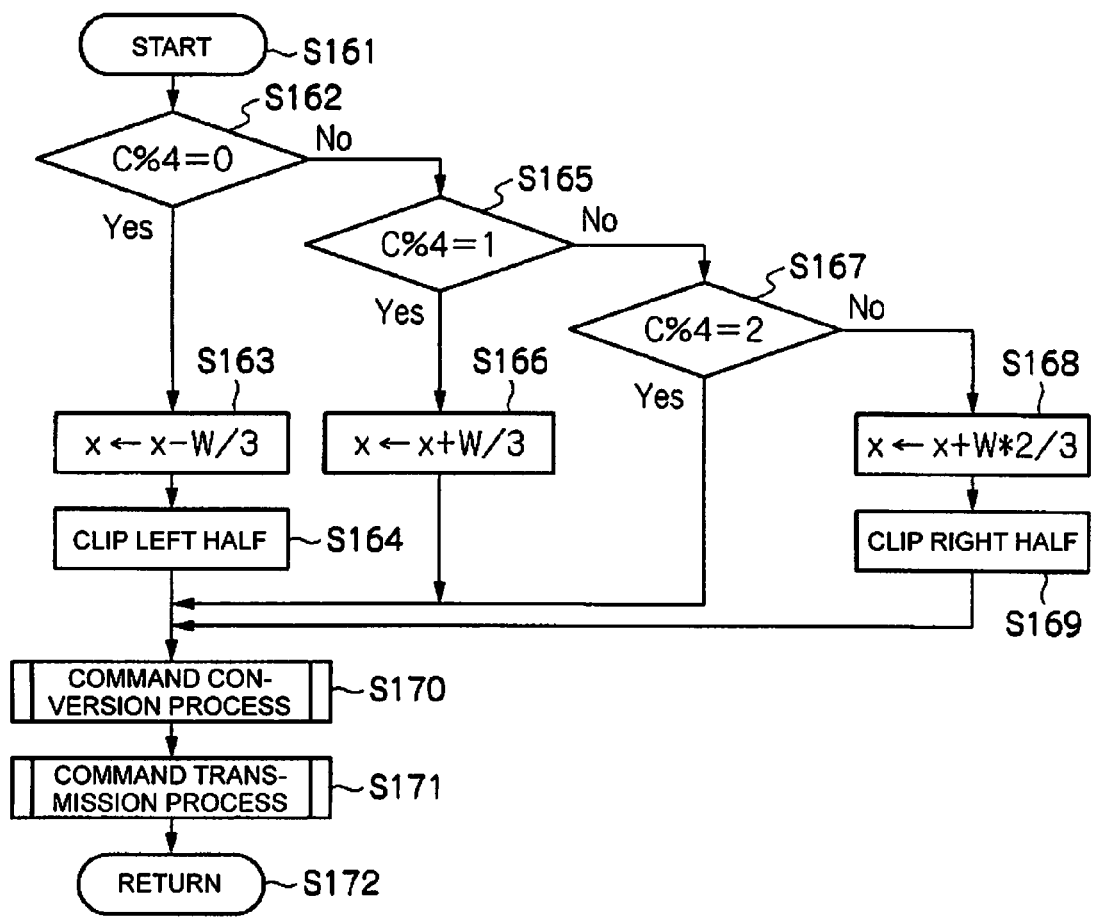
FIG. 13 is a flowchart illustrating a process of correction and clipping to a position suitable for three-fold printing of actual physical pages, when generated drawing data is drawn.

Drawing data generated by application 2 according to the page size sent back in reply to operating system 3 further needs to be corrected and clipped during the drawing to a position of actual physical pages which is suitable for three-fold printing. The correction and clipping are a scheme which varies depending on Page No., and FIG. 13 illustrates the processing then.

When an image position clipping process starts (S161), first, printer driver renderer 9 called by print processor 10 judges a value of the page counter c (S162). Here, if it is judged that a value represents 1/4 page (Yes), coordinate conversion processing unit 41 subtracts 1/3 of logical sheet width W from the width x (S163), and data clipping processing unit 42 clips a left half (S164).

Then, printer command converter 43 converts the drawing data into a printer command (S170), transmits the command to printer 11 (S171), and returns to the first process (S172).

On the one hand, if the judgment is No in S162, a value of the page counter c is further judged (S165). Here, if it is judged that the value represents 2/4 page (Yes), coordinate conversion processing unit 41 adds 1/3 of the logical sheet width W to the width x (S166), but no clipping process is performed.

Then, the processing in S170 and S171 described above is performed, and the process returns to the first process (S172).

On the one hand, if the judgment is No in S165, a value of the page counter c is further judged (S167). Here, if it is judged that the value represents 3/4 page (Yes), neither correction nor clipping is performed, and the positions remain unchanged. Then, the processing in S170 and S171 described above is performed, and the process returns to the first process (S172).

If it is judged in S167 that the value represents 4/4 page (No), coordinate conversion processing unit 41 adds 2/3 of the logical sheet width W to the width x (S168), and data clipping processing unit 42 clips a right half (S169). Then, the processing in S170 and S171 described above is performed.

Then, when processing of all pages ends, the image position clipping process ends.

Figure 14:
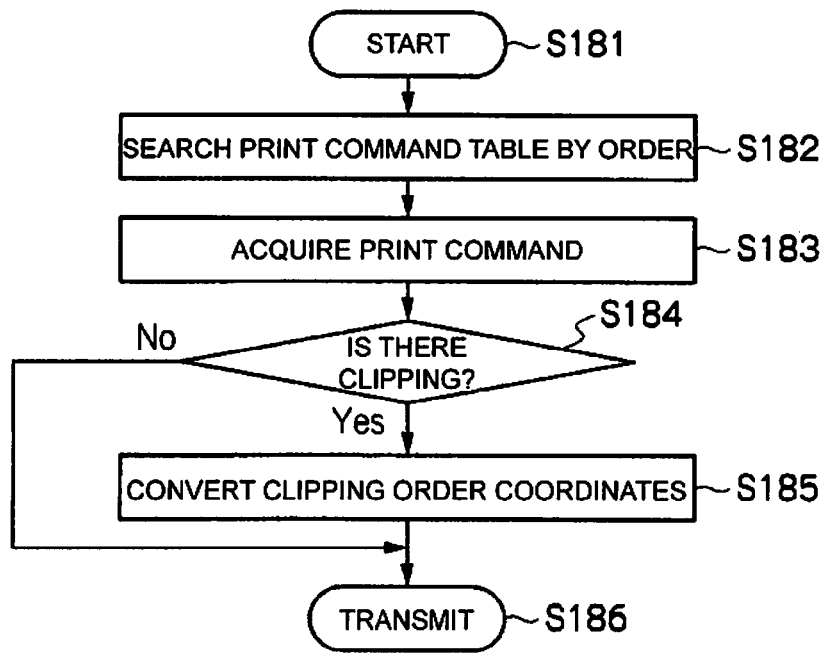
FIG. 14 is a flowchart illustrating a printer command conversion process.

In the following, FIG. 14 illustrates a printer command conversion process.

When the printer command conversion process starts (S181), first, printer command converter 43 searches by-order print command table 47 for a command for print image data contained in EMF file 7 (S182), and retrieves the command for the data (S183). Then, it is judged whether or not clipping is added to the data (S184). Here, if it is judged that clipping is added to the data, coordinate conversion corresponding to a clipping command is performed to create a command (S185) and transmit the data (S186).

On the one hand, if it is judged that no clipping is added to the data, the data is directly transmitted (S186).

(A-3) Effect

With the above, there is no longer a need to consider in advance in what arrangement each logical page must be printed in order to make two spread faces by double running pages in the process of unfolding three folds, thus enabling three-fold printing to be performed easily. Specifically, in the three-fold printing, in order to obtain a three-fold print result in which of each logical page forming a folded state, two spread pages are configured by double running pages, a user can create data in page order similar to an ordinary document without being conscious of such a configuration. In addition, in order to print that data and achieve three folds, printing can be achieved only through a simple procedure. In addition, a print result can be obtained by selection, through simple settings, of any combination from four combinations of C-folds, Z-folds, right-front, or left-front.

Figure 15:
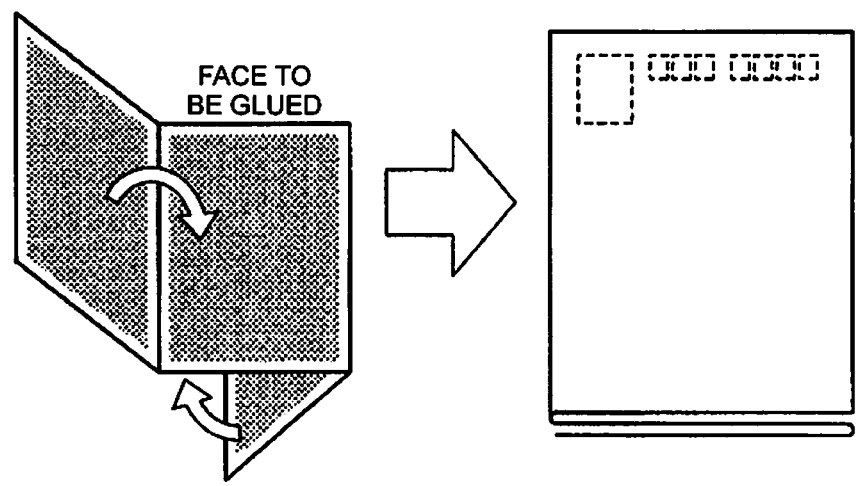
FIG. 15 is a schematic view illustrating a folded-in postcard.

Furthermore, these functions can be implemented as a choice of settings of various layout print functions of a printer driver and can be made selectable together with double-side printing, N-up printing, or two-fold bookbinding print function. With this, the three-fold printing function can be implemented in various devices in combination with various media. For example, as illustrated in FIG. 15, it is possible to create a folded-in postcard by combining a medium, which becomes a postcard size by being folded in three, with Z-fold printing, and further gluing a folded-in side. Note that this is also applicable to C-fold printing.

Second Embodiment

In the following, a second embodiment of the invention is described.

(B-1) Configuration

Figure 16:
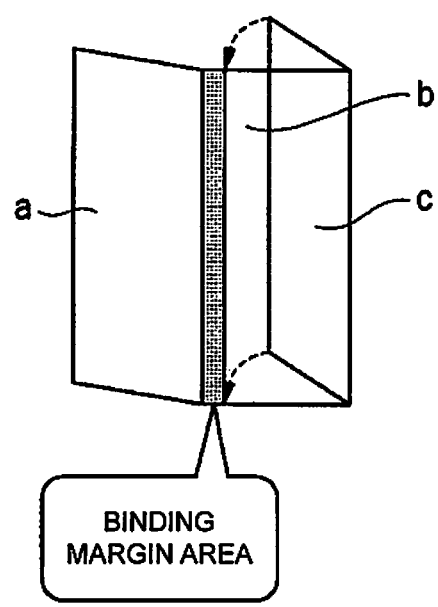
FIG. 16 is a schematic view illustrating an example of a sheet of paper provided with a binding margin according to a second embodiment of the invention.

Although the image processing apparatus of the first embodiment described above enables three-fold printing, there may occur some interference when a result of the three-fold printing is obtained, and mountain folds and valley folds are actually applied for shaping. Specifically, in the case of C-folds, in a mode in which page [c] of three pages [a], [b], and [c] is folded in, a valley fold at a boundary between [a] and [b] may interfere with an end of page [c]. Then, if they interfere, a distortion may occur in a booklet in a state in which it is folded in three. When the width of three logical pages forming three folds is exactly identical, it is possible that a significant distortion occurs due to the thickness of a sheet or variations in the precision of a user's manual fold-in work. To avoid this, a binding margin may be provided. As illustrated in FIG. 16, by making the length of page c somewhat shorter, allocating the shortened page length to pages a and b, and providing an extra area thereon as a binding margin, it is possible to effectively reduce the distortion.

Although it is difficult to manually add such a binding margin to a folding line, it is possible to achieve high-quality three-fold printing by arranging fold lines at positions for which a driver allows for a binding margin in advance.

Figure 17:
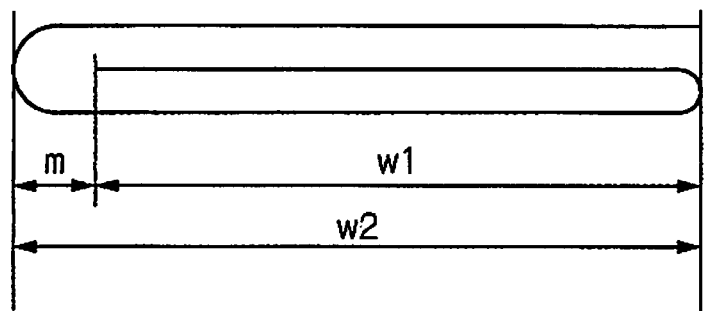
FIG. 17 is a top view when a sheet folded in three is viewed from an end thereof, according to the second embodiment of the invention.
Figure 18:
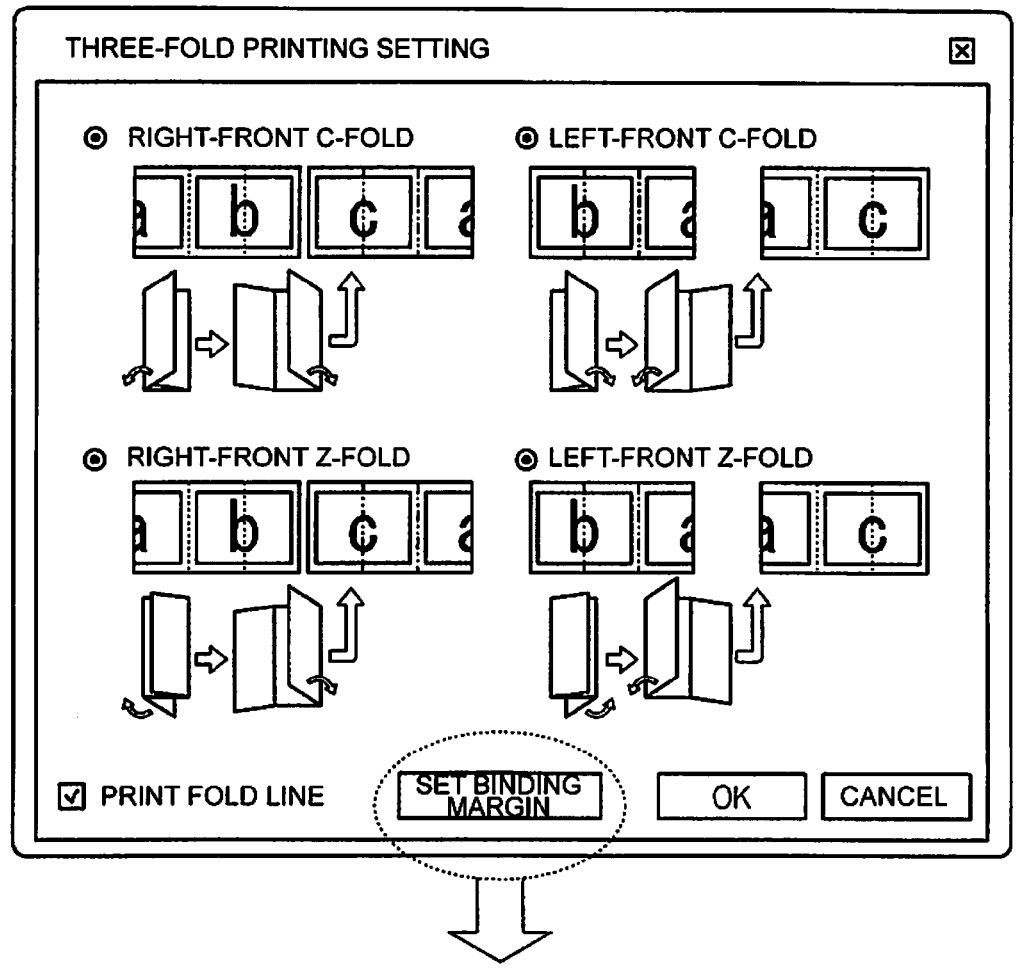
FIG. 18 is a schematic view illustrating a dialog for setting the binding margin according to the second embodiment of the invention.
Figure 18:
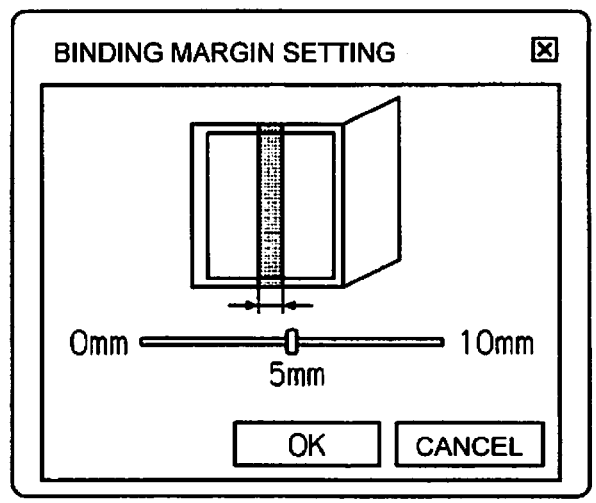
Figure 19:
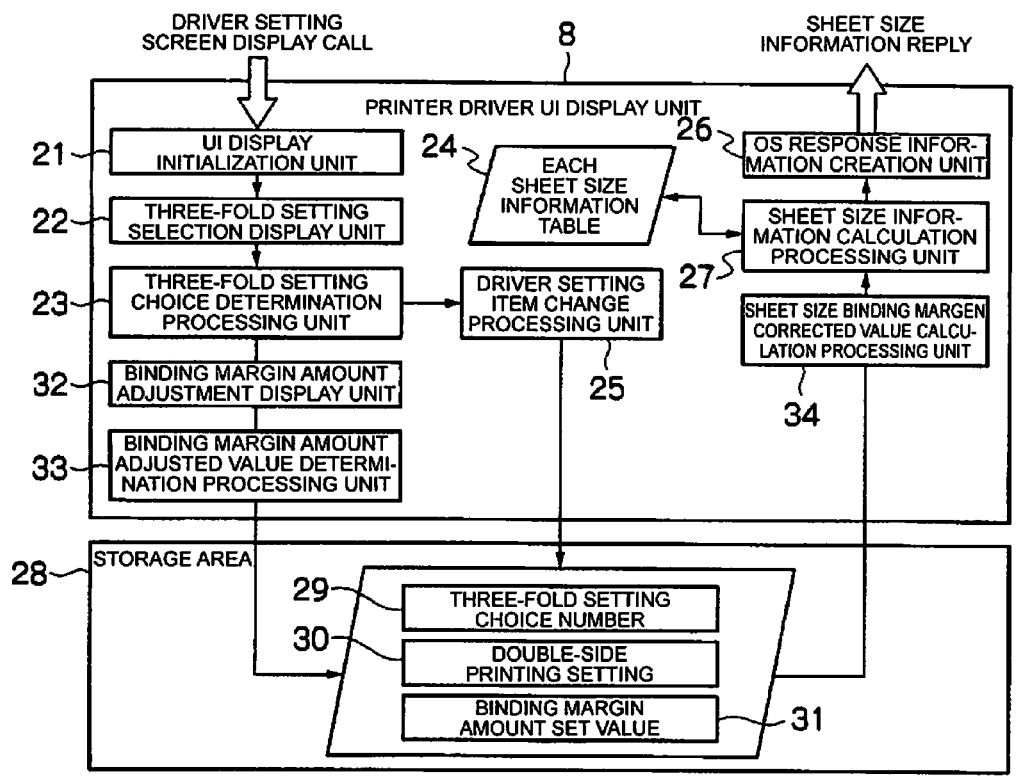
FIG. 19 is a schematic configuration diagram illustrating a printer driver UI display unit according to the second embodiment of the invention.
Figure 20:
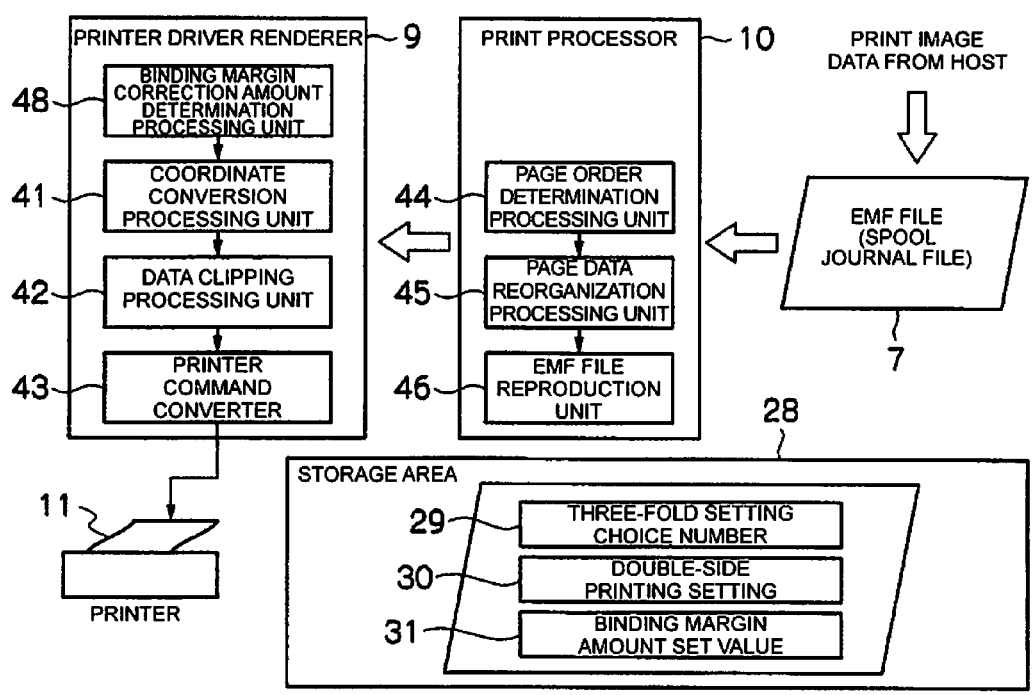
FIG. 20 is a schematic configuration view illustrating a printer driver renderer and a print processor according to the second embodiment of the invention.

The driver allows a user to arbitrarily adjust an amount of binding margin m to be added as illustrated in FIG. 17, and a user interface for adjusting the amount of binding margin is provided. As illustrated in FIG. 18, binding margin setting dialog is called with Set Binding Margin button, and the amount of binding margin is arbitrarily adjusted. This amount of binding margin can be set to any amount from 0 mm to 10 mm in the example of the figure. The binding margin amount may be 10 mm or more. In addition, a setting interval can be set to any amount in units of 1 mm. Alternatively, the setting interval may be set in any unit which is shorter or longer than 1 mm.

As illustrated in a top view of FIG. 17 in which a sheet folded in three is viewed from an end thereof, if the width of an inner page is w1, an amount of binding margin is m, and the width of an outer page is w2, then the amount of binding margin set here is w1+m=w2 and in a relation of W=(w1×2)+(m×2) with respect to physical sheet width W.

In addition, the page width when the binding margin is added is w1=(W/3)−mw2=(W/3)−(m×2) since the inner page is W/3=w1+m.

In the following, a configuration of an image processing apparatus of the embodiment is described. Since an overall configuration of the image processing apparatus of the embodiment is almost similar to the image processing apparatus of the first embodiment as described above, identical members are assigned with identical symbols and a description thereof is omitted. In addition, FIG. 18 is a schematic view illustrating an example in which the binding margin setting dialog is provided on the three-fold printing setting screen in FIG. 5 for the first embodiment. This binding margin setting dialog in FIG. 18 is a binding margin amount preview display unit which displays on a screen a relationship between a binding margin amount and a print result to set the binding margin amount.

In addition to the configuration of the image processing apparatus of the first embodiment, the image processing apparatus of the embodiment further includes area binding margin amount set value 31, binding margin amount adjustment display unit 32, binding margin amount adjusted value determination processing unit 33, sheet size binding margin correction amount calculation processing unit 34, and binding margin correction amount determination processing unit 48.

Binding margin amount adjustment display unit 32 is configured to display to printer driver UI display unit 8 a dialog for setting a binding margin amount. Binding margin amount adjusted value determination processing unit 33 is configured to determine a binding margin after it is set through user operation. Specifically, binding margin amount adjusted value determination processing unit 33 determines as a correction amount a set value which the user sets in the binding margin amount preview display unit. Area binding margin amount set value 31 is placed in storage area 28. This storage area 28 is an area for reflecting a selected arrangement method or double-side printing setting during printing. The determined adjusted value is retained as a binding margin amount set value in this storage area 28.

The sheet size information generated in sheet size information calculation processing unit 27 represents a size obtained by subtracting the correction amount calculated in sheet size binding margin correction amount calculation processing unit 34 from a value obtained by trisecting a physical sheet to which binding margin amount set value 31 is added. Specifically, sheet size information calculation processing unit 27 is configured to add a binding margin on the basis of binding margin amount set value 31 retained in storage area 28 and converts the sheet size into one suitable for three-fold printing.

In addition, while printing is carried out, in printer driver renderer 9, binding margin correction amount determination processing unit 48, configured to determine a correction amount by a binding margin on the basis of binding margin amount set value 31 saved in storage area 28, calculates a travel amount of coordinates to be added to coordinate conversion processing unit 41. Specifically, binding margin correction amount determination processing unit 48 calculates a correction amount for the coordinates from a set amount of the binding margin.

(B-2) Operation

Since the image processing apparatus configured as above generally works in an almost similar manner to the image processing apparatus of the first embodiment as described above, processing specific to the image processing apparatus of this embodiment is described below.

Figure 21:
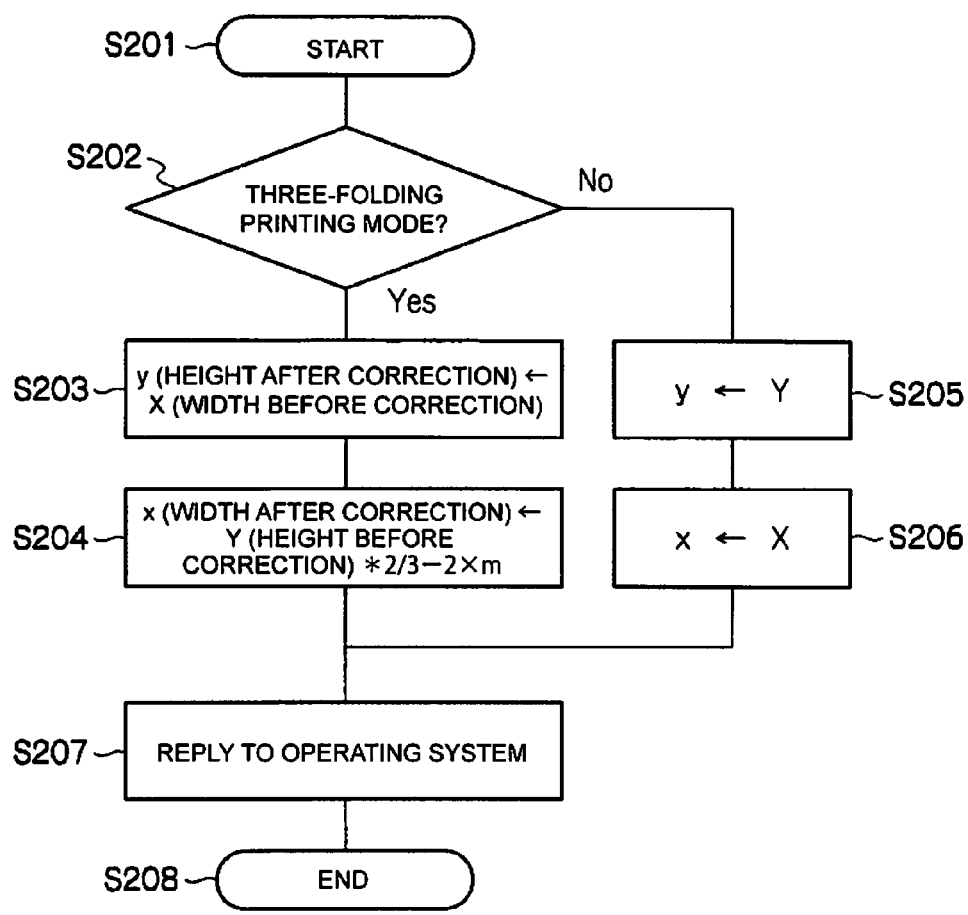
FIG. 21 is a flowchart illustrating a page size correction process of a driver when a page size is made suitable for three-fold printing.

In contrast to the processing in the first embodiment, in printer driver renderer 9, sheet size information calculation processing unit 27 configured to calculate information to sent back page size works as illustrated in FIG. 21.

When a process starts in response to a call from operating system 3 (S201), three-fold setting choice number 29 is acquired from the storage area to judge whether or not there is three-fold printing (S202). Here, if it is judged that there is three-fold printing (Yes), similar to the first embodiment, width X before correction is directly used as height y after correction (S203).

On the one hand, for width x after correction, a value obtained by subtracting a binding margin amount m×2 from a value of height Y before correction×(2/3) is used (S204). A value thus determined is sent back in reply to operating system 3 (S207), and the process ends (S208).

On the one hand, if it is judged in S202 that there is not three-fold printing (No), the height y after correction is made the same value as the original physical page size (S205), and the width x after correction is made the same value as the original physical page size (S206). Then, the values are sent back in reply to operating system 3 (S207), and the process ends (S208).

Figure 22:
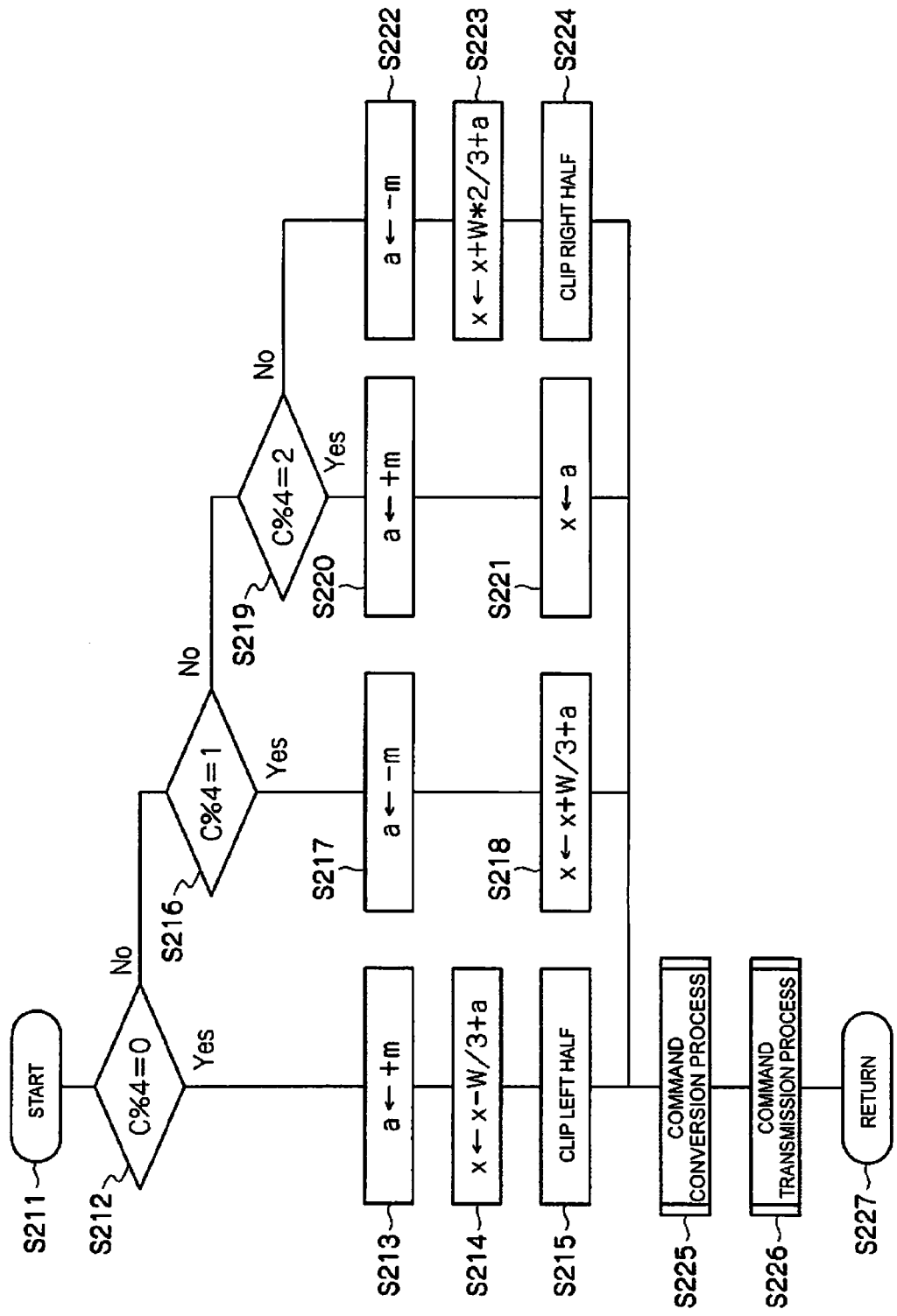
FIG. 22 is a flowchart illustrating a process of correction and clipping to a position suitable for three-fold printing of actual physical pages, when generated drawing data is drawn.

Correction and clipping are as illustrated in FIG. 22. Specifically, printer driver renderer 9 judges a value of the page counter c (S212) when printing called from print processor 10 is executed (S211). Here, if it is judged that the value represents 1/4 page (Yes), with a correction amount as a binding margin amount (S213), coordinate conversion processing unit 41 subtracts 1/3 of logical page width W from the width x and adds a binding margin amount a (S214), and data clipping processing unit 42 clips a left half (S215).

Then, printer command converter 43 converts the drawing data into a printer command (S225), transmits the command to printer 11 (S226), and returns to the first process (S227).

On the one hand, if the judgment is No in S212, a value of the page counter c is further judged (S216). Here, if it is judged that the value represents 2/4 page (Yes), with a negative value of the correction amount as the binding margin amount (S217), coordinate conversion processing unit 41 adds 1/3 of logical sheet width W to the width x, and adds the binding margin amount a (S218). Then, the processing in S225 and S226 described above is performed and the process returns to the first process (S227).

On the one hand, if the judgment is No in S216, a value of the page counter c is further judged (S219). Here, if it is judged that the value represents 3/4 page (Yes), with a positive value of the correction amount as a binding margin amount (S220), coordinate conversion processing unit 41 adds the binding margin amount a to the width x (S221). Then, the processing in S225 and S226 described above is performed and the process returns to the first process (S227).

If it is judged in S219 that the value represents 4/4 page (No), with a negative value of the correction amount as a binding margin amount (S222), coordinate conversion processing unit 41 adds 2/3 of the logical sheet width W to the width x and adds the binding margin amount a (S223), and data clipping processing unit 42 clips a right half (S224). Then, the processing in S225 and S226 described above is performed and the process returns to the first process (S227).

Then, when processing of all pages ends, the image position clipping process ends.

(B-3) Effect

With the above, it becomes possible to set a binding margin and an amount of the binding margin easily and arbitrarily.

Furthermore, a three-fold print result to which a binding margin is added makes it possible to obtain a result of a three-fold booklet with little distortion even under the influence of the sheet thickness or irregularity of folding. Yet, users can specify the settings through a simple procedure, and easily create/edit data without being conscious of a change in page size due to whether or not there is a binding margin.

INDUSTRIAL APPLICABILITY

In the embodiments described above, the image processing apparatuses are described as functions of a printer and a printer driver corresponding thereto are described. They can be used as an image device including an MFP, a printer and the like and an image processing apparatus using them.

Note that the aspects of the invention are not limited to the embodiments described above and include various variations which those skilled in the art can conceive, and the effect of the invention is not limited to what has been described above. Specifically, various additions, changes, a combination and a partial deletion and the like are possible within the scope of not deviating from a conceptual idea and intention of the invention to be derived from content specified in the Claims and equivalents thereto.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. An image processing apparatus, comprising:
   an image data arrangement unit configured to arrange pages of specified print image data on front and back sides of a print sheet according to three-fold printing which assumes three folds, with the image data arrangement unit creating arrangement modes;

a preview display unit configured to display, on a screen, at least two of the arrangement modes at the same time, each of the at least two of the displayed arrangement modes comprising: an image of at least one of an unfolded state of the print sheet and a folded state of the print sheet with at least one part of the three folds folded, and at least a portion of a print image on the front side of the print sheet and at least a portion of the print image on the back side of the print sheet;

a print mode specification unit configured to allow one arrangement mode to be specified, as a print mode, from the arrangement modes displayed on the preview display unit; and a printer command converter configured to generate a print command to print in the print mode specified through the print mode specification unit, wherein the image data arrangement unit is configured to receive a first image, a second image, and a third image, and to create a front side print data for arranging a first side of the first image and the second image on a front side of the print sheet and a back side print data for arranging a second side of the first image and the third image on a back side of the print sheet, and wherein the preview display unit is configured, upon displaying preview images of the front side print data and the back side print data, to display an image corresponding to the first side of the first image and the second image and a first fold line between the first side of the first image and the second image, and to display an image corresponding to the second side of the first image and the third image and a second fold line between the second side of the first image and the third image.

2. The image processing apparatus according to claim 1, further comprising:

a storage area configured to store the arrangement modes created by the image data arrangement unit;

a UI display initialization unit configured to initially display a three-fold setting screen which displays the arrangement modes stored in the storage area in the preview display unit;

a three-fold setting choice determination processing unit configured to determine which is an item a user selects from the three-fold setting screen displayed in the preview display unit; and a print setting item change processing unit configured to automatically set and specify a command to instruct execution of a double-side printing operation necessary for arrangement of the image data on the front and back sides of the print sheet when the determined item specifies the three-fold printing.

3. The image processing apparatus according to claim 2, further comprising:

a printer driver UI display unit configured to transmit sheet size information in response to a driver setting screen display call, wherein the printer driver UI display unit comprises:

an each sheet size information table configured to at least retain information on sheet size that a printer can handle and a printable area;

a sheet size information calculation processing unit configured to acquire from the storage area whether or not there is the three-fold printing, and to change sheet size to one suitable for the three-fold printing on the basis of the sheet size information retrieved by searching the each sheet size information table; and an OS response information creation unit configured to output the sheet size information which is changed by the sheet size information calculation processing unit.

4. The image processing apparatus according to claim 3, further comprising:

a print processor configured to read an EMF file containing print image data per page, wherein the print processor comprises:

a page order determination processing unit configured to determine page order suitable for the three-fold printing, according to the information on whether or not there is the three-fold printing, the information being stored in the storage area;

a page data reorganization processing unit configured to sort page numbers according to the resulting page order obtained; and an EMF file reproduction unit configured to call, on the basis of reorganized page data, a printer driver renderer configured to convert a draw order into a command.

5. The image processing apparatus according to claim 4, wherein the printer driver renderer comprises:

a coordinate conversion processing unit configured to be called by the EMF file reproduction unit and determine coordinates converted to arrange the image data on an appropriate logical page position in a physical sheet, depending on whether or not there is the three-fold printing;

a data clipping processing unit configured to perform conversion to delete any coming-out part, due to the result of the conversion by the coordinate conversion processing unit, on data located in coordinates out of the physical sheet and on data coming out of the logical page and located in a range overlapping another logical page; and the printer command converter configured to convert final print image data, on which coordinate conversion and clipping processes are performed, into a printer print command.

6. The image processing apparatus according to claim 1, further comprising:

a binding margin amount preview display unit configured to display on a screen a relation of a binding margin amount and a print result, in order to set the binding margin amount.

7. The image processing apparatus according to claim 6, comprising:

a binding margin amount adjusted value determination processing unit configured to determine a set value which the user sets on the binding margin amount preview display unit, as a correction amount; and the storage area configured to retain the determined adjusted value as a binding margin amount set value.

8. The image processing apparatus according to claim 7, wherein the sheet size information calculation processing unit is configured to add a binding margin to convert sheet size into one suitable for the three-fold printing on the basis of the binding margin amount set value retained in the storage area.

9. The image processing apparatus according to claim 8, further comprising:

a binding margin correction amount determination processing unit configured to calculate a correction amount for the coordinates from a set amount of binding margin.

10. An image processing apparatus, comprising:

an image data arrangement unit configured to perform arrangement of print image data of each page on front and back sides of a sheet, according to multiple-fold printing which assumes multiple-fold equal to or more than three folds;

a preview display unit configured to display, at the same time on a screen, at least two arrangement modes, each of the at least two of the displayed arrangement modes including: an image of at least one of an unfolded state of the print sheet and a folded state of the print sheet with at least one of fold positions in the multiple-fold being folded and at least one of the other fold positions being spread, and at least a portion of a print image on the front side of the print sheet and at least a portion of the print image on the back side of the print sheet; and a print command output unit configured to output a print command based on an arrangement mode displayed on the preview display unit, wherein the image data arrangement unit is configured to receive a first image, a second image, and a third image, and to create a front side print data for arranging a first side of the first image and the second image on a front side of the print sheet and a back side print data for arranging a second side of the first image and the third image on a back side of the print sheet, and wherein the preview display unit is configured, upon displaying preview images of the front side print data and the back side print data, to display an image corresponding to the first side of the first image and the second image and a first fold line between the first side of the first image and the second image, and to display an image corresponding to the second side of the first image and the third image and a second fold line between the second side of the first image and the third image.

11. An image forming system, comprising:

an image data arrangement unit configured to perform arrangement of print image data of each page on front and back sides of a sheet, according to multiple-fold printing which assumes multiple-fold equal to or more than three folds;

a preview display unit configured to display, on a screen, the image data with at least one of fold positions in the multiple-fold being folded and with at least one of the other fold positions being spread, on the basis of an arrangement by the image data arrangement unit, the preview display unit configured to display, on the screen, the print sheet with at least one fold position of the multiple folds being folded, and to display, on the screen, at least a portion of a print image on the front side of the print sheet and at least a portion of the print image on the back side of the print sheet; and a print command output unit configured to output a print command based on an arrangement mode displayed on the preview display unit;

a print unit configured to print on a sheet based on the print command outputted from the print command output unit;

a binding margin setting unit configured to set a binding margin; and a data clipping processing unit, wherein the preview display unit is configured to display on the screen at least two of the arrangement modes with at least one part of the multiple folds folded, wherein the image data arrangement unit is configured to receive a first image, a second image, and a third image, and to create a front side print data for arranging a first side of the first image and the second image on a front side of the print sheet and a back side print data for arranging a second side of the first image and the third image on a back side of the print sheet, wherein the data clipping processing unit is configured to set a clipping area of the first side of the first image or the second side of the first image to be clipped based on the binding margin, and wherein the preview display unit is configured, upon displaying preview images of the front side print data and the back side print data, to display an image corresponding to the first side of the first image and the second image and a first fold line between the first side of the first image and the second image, and to display an image corresponding to the second side of the first image and the third image and a second fold line between the second side of the first image and the third image.

12. The image forming system according to claim 11, wherein a booklet corresponding to display of the preview display unit can be obtained by a user folding, at the hold positions, the sheet printed by the print unit based on the print command.

13. The image processing apparatus according to claim 1, wherein the preview display unit is further configured to display on the screen a line corresponding to the at least one fold position.

14. The image processing apparatus according to claim 10, wherein the preview display unit is further configured to display on the screen a line corresponding to the at least one fold position.

15. The image forming system according to claim 11, wherein the preview display unit is further configured to display on the screen a line corresponding to the at least one fold position.

16. The image processing apparatus according to claim 1, wherein the printer command converter is further configured to generate the print command to print first type of characters to indicate a valley fold to be made on the print sheet, and to print second type of characters to indicate a mountain fold to be made on the print sheet.

17. The image processing apparatus according to claim 16, wherein the first type of characters comprise a dashed line on the print sheet, and wherein the second type of characters comprise a dash-dot-dash line on the print sheet.

18. The image processing apparatus according to claim 10, wherein the printer command output unit is further configured to generate the print command to print first type of characters to indicate a valley fold to be made on the print sheet, and to print second type of characters to indicate a mountain fold to be made on the print sheet.

19. The image processing apparatus according to claim 18, wherein the first type of characters comprise a dashed line on the print sheet, and wherein the second type of characters comprise a dash-dot-dash line on the print sheet.

20. The image forming system according to claim 11, wherein the printer command output unit is further configured to generate the print command to print first type of characters to indicate a valley fold to be made on the print sheet, and to print second type of characters to indicate a mountain fold to be made on the print sheet.

21. The image forming system according to claim 20, wherein the first type of characters comprise a dashed line on the print sheet, and wherein the second type of characters comprise a dash-dot-dash line on the print sheet.

22. The image forming apparatus according to claim 1, wherein the preview display unit is configured, when displaying a first fold position and a second fold position different from the first fold position, to display a preview image of a first arrangement mode with the first fold position being folded first and then the second fold position being folded, and a preview image of a second arrangement mode with the second fold position being folded first and then the first fold position being folded, wherein the first arrangement mode and the second arrangement mode are different from each other.

23. The image forming apparatus according to claim 10, wherein the preview display unit is configured, when displaying a first fold position and a second fold position different from the first fold position, to display a preview image of a first arrangement mode with the first fold position being folded first and then the second fold position being folded, and a preview image of a second arrangement mode with the second fold position being folded first and then the first fold position being folded, wherein the first arrangement mode and the second arrangement mode are different from each other.

24. The image forming system according to claim 11, wherein the preview display unit is configured, when displaying a first fold position and a second fold position different from the first fold position, to display a preview image of a first arrangement mode with the first fold position being folded first and then the second fold position being folded, and a preview image of a second arrangement mode with the second fold position being folded first and then the first fold position being folded, wherein the first arrangement mode and the second arrangement mode are different from each other.

25. The image processing apparatus according to claim 1, further comprising:

a binding margin setting unit configured to set a binding margin; and a data clipping processing unit configured to set a clipping area of the first side of or the second side of the first image to be clipped based on the binding margin.

* * * * *